Aug. 23, 1932.  C. L. JONES ET AL  1,873,130
CONTACT FREEZING APPARATUS AND METHOD
Filed Jan. 2, 1930
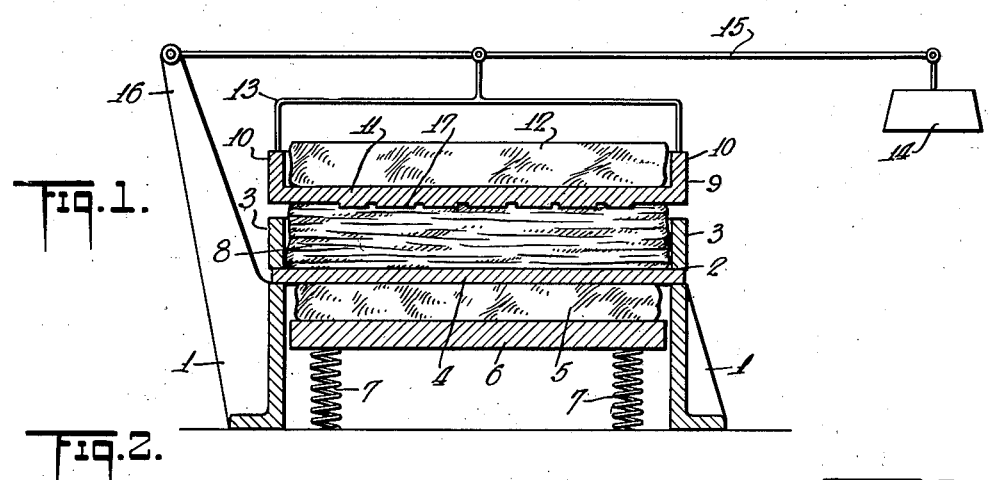
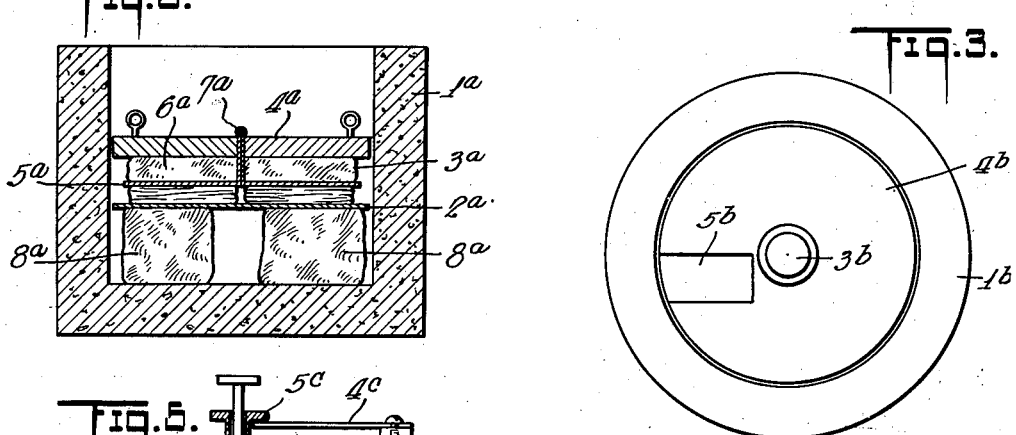
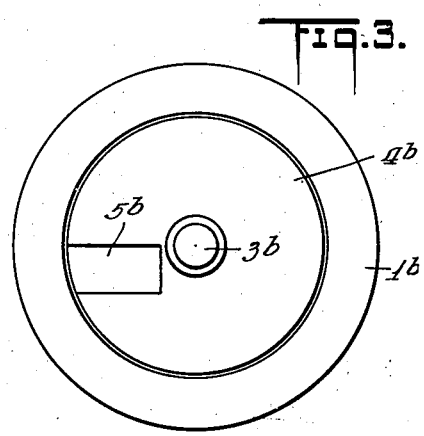
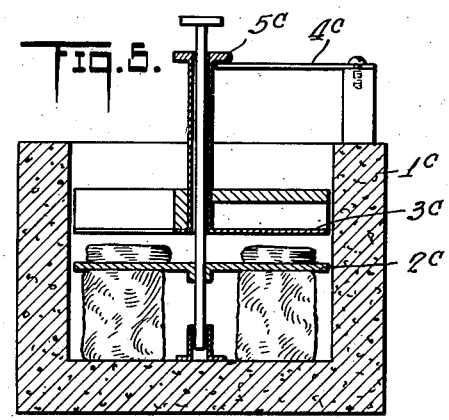
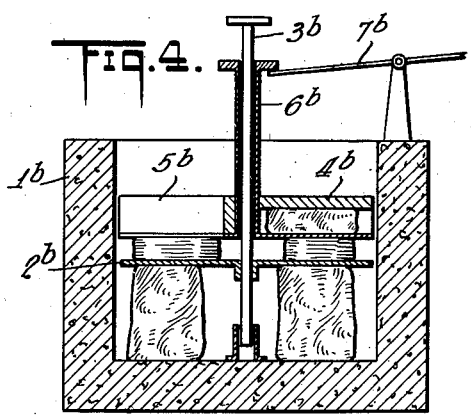
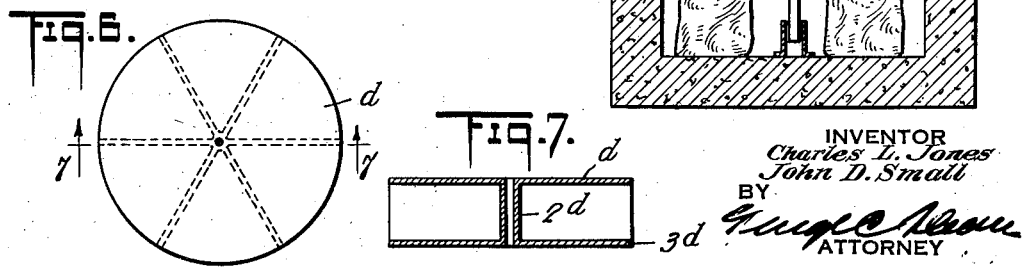
INVENTOR
Charles L. Jones
John D. Small
BY
ATTORNEY Patented Aug. 23, 1932

1,873,130

UNITED STATES PATENT OFFICE

CHARLES L. JONES, OF PELHAM, AND JOHN D. SMALL, OF DOUGLASTON, NEW YORK, ASSIGNORS TO DRYICE EQUIPMENT CORPORATION, OF NEW YORK, N. Y., A CORPORATION OF DELAWARE

CONTACT FREEZING APPARATUS AND METHOD

Application filed January 2, 1930. Serial No. 417,852.

Our present invention relates to methods of and apparatus for contact cooling of freezable products, particularly for freezing or subcooling them far below the freezing point of water and while particularly applicable to fresh meats or to preserved meats such as bacon, ham or the like, the invention and various features thereof may be used in other connections and for other purposes.

An object of our invention is to provide a small, compact cooling device of low cost, which is well adapted to freeze and, if desired, over-freeze the product in a remarkably short time.

An important object of the invention is to provide a freezing apparatus in which the full benefits of the low temperature and peculiarities of solid carbon dioxide are taken advantage of and applied in a very economical manner.

A further object is to provide a means by which a frozen product may be given any desired impression, such as the name or trademark of the manufacturer, grade or inspection marks, by impressing the same in the product before and during freezing.

Solid carbon dioxide evaporates to gas yielding refrigerant temperatures of 100° or more below zero F. Somewhat more than half of the refrigerant value is developed by the heat absorption that changes the solid to gas, while nearly as much of the refrigerant value is in the escaping gas. However, most commercial refrigerant operations must be conducted at very much higher temperatures and it has been customary to apply all of the refrigerant values through the medium of a gas or air circulation. For our present purposes of quick cooling, subcooling, freezing and "superfreezing", particularly products having a freezing point below the freezing point of water, we have discovered that both the speed and efficiency of the heat transfer can be enormously increased by affording a direct conducting path, in the form of a metal plate or a similar member having the solid carbon dioxide in firm contact with one surface thereof while the product to be refrigerated is in direct contact with the other surface. This applies the refrigerant value of the heat absorption that changes the solid to a gas, in the most direct manner possible.

It similarly directly applies a greater or less proportion of the refrigerant value of the gas evolved at or near the contact of the solid carbon dioxide with the plate, but remaining refrigerant value of the gas and also its insulating and drying effect, are utilized mainly in a protective way. This will be evident from the fact that great area of surface contact of the product with the plate leave only a small area exposed to the gas and from the fact that heat transfer from gas to solid is always slow as compared with contact transfer between contacting solid or liquids.

The above and other features of our invention will be more evident from the following description, in connection with the accompanying drawing, in which we have shown diagrammatically, some simple forms of our invention as applied to freezing a slab of bacon or the like, but we do not wish to be limited to any particular product to be frozen, or to a particular form or construction of apparatus for freezing the same. In this drawing:

Fig. 1 is a vertical sectional view of one form of the apparatus;

Fig. 2 is a vertical sectional view of a modification thereof, the same being placed within an outer insulated container;

Figs. 3 and 4 are further modifications, Fig. 3 being a partial plan view of Fig. 4;

Fig. 5 is another slight modification;

Fig. 6 is a modification of the lower plate of the apparatus; and

Fig. 7 is a sectional view of Fig. 6.

In Fig. 1 the freezing apparatus is shown as comprising supports 1 for a holder 2 which comprises a plate 4 on which the freezable product rests. The supports 1 may be the walls of a frame or of a box adapted to retain the gas from the solid carbon dioxide.

The plate 4 is of a good heat conducting material, preferably a metal such as aluminum, or the like and the walls 3 may be of insulating material. Below the plate 4 is the refrigerant 5 supported by the follower member 6 which is pressed upwards by any suitable means, such as the springs 7, to keep the refrigerant 5 in intimate contact with the plate 4, although it continuously becomes thinner by evaporation.

The freezable product 8 contacts on its upper side with the refrigerant holder 9 comprised of the sides 10 and lower surface 11. The latter surface may be patterned as indicated by projections 17. Except for the necessary changes in structural detail, the upper refrigerant container 9 should be substantially the same as the lower refrigerant container 2. Placed within the container 9 is the refrigerant 12.

The yoke 13 raises or lowers the container 9 through the weight 14 swinging from the arm 15 which is attached to the extension 16 of one of the supporting elements 1. Any means whatever may be used in place of the last mentioned elements to raise or lower the container 9, the same having been shown here diagrammatically merely for the purposes of illustration.

In operation the apparatus is quite simple. The upper section 9 may be raised sufficiently high so that the product to be frozen can be placed in the holder 2, the section 9 then being lowered so that the surface 11 will be in contact with the freezable product. The lower plate 4 will be refrigerated by means of the refrigerant 5 being forced to contact therewith through pressure being applied to the element 6 by the spring 7. When solid carbon dioxide is used as a refrigerant with its extremely low temperature of approximately 110° F. below zero, it can readily be seen that with good heat conducting material for the elements affording the surfaces 4 and 11, the product can be frozen in a very short time.

When a contact surface is embossed as at 17, Fig. 1, the letters, numerals or other patterns are impressed or embossed on the unfrozen product by the initial pressure, and the elevations and depressions thus formed will be frozen in the surface of the product, but when it again becomes pliable, the impression will tend to disappear. This makes possible the very novel and valuable innovation in merchandising methods, in that thus frozen meat or fish or other food may be distinctively marked during shipment, display and sale, yet will appear free of any such marking when served to the consumer. We have shown this means of marking only on one plate in Fig. 1, but it is quite evident that it may be on both the upper and lower plates and may be utilized in any or all of the various modifications.

Most arrangements or apparatuses heretofore used for freezing meats and the like have necessarily been quite large due to the fact that the freezing was a very slow process and in order to make the operation a commercial success, it has been necessary to freeze a large volume at one freezing. What are known in the art as "sharp" freezers generally require over twenty-four hours to complete the freezing, depending on the thickness and initial temperature of the product, while the so-called "quick freezing" processes require up to twelve hours for freezing. When it is understood that in none of these processes is the temperature of the refrigerating medium rarely if ever lower than 50° F. below zero, it will be quite apparent wherein our invention is such an improvement over present methods.

In our invention the solid carbon dioxide rests directly against the refrigerating surfaces, which surfaces are in immediate contact with the sides of the freezable product, the blanket of carbon dioxide gas which would normally surround the solid carbon dioxide being expelled from the sides in contact with the refrigerating surface but substantially enveloping the rest of the solid, thereby tending to preserve the same. This allows the solid carbon dioxide with its extremely low temperature of approximately 110° F. below zero, to contact with one surface of a very good heat conducting material, the other surface being in contact with the product to be frozen.

In Fig. 2, we have shown a modification, the apparatus being in an outer insulating container 1a and comprising a lower plate 2a, an upper section 3a, preferably cellular, which consists of an insulating portion 4a and lower plate 5a. The upper section 3a is arranged to hold a refrigerant 6a in contact with the element 5a. This upper section may be also hinged at the center point 7a. This allows for the opening of a part only, of the apparatus, thereby permitting inserting therein or removing therefrom a portion of a charge of refrigerant or product to be frozen without disturbing the other portion. This form, of course, need not necessarily be hinged to two sections only. Solid carbon dioxide 8a is also placed on the bottom of the container 1a and the upper plate 2a rests directly thereon. As the solid carbon dioxide 8a sublimes, the whole apparatus descends by its own weight and plate 2a maintains constant contact with the solid carbon dioxide.

In Fig. 4 is shown a further modification comprising the outer container 1b and the lower plate 2b rigidly attached to the handle 3b and arranged to be revolved by means of the handle 3b. The upper plate 4b is also of cellular construction being arranged to contain the refrigerant within the cells and having on its other side the opening 5b. The upper section 4b is arranged to be revolved or moved vertically by means of an extension 6b and lifting handle 7b. This form of apparatus is particularly adaptable where the product to be frozen is comparatively small, such as chops, one chop being removed through the opening 5b and another being inserted before the section 4b is revolved so that the opening 5b is above the next chop to be removed. In this way only a very small portion of the freezing apparatus is exposed to the atmosphere.

Fig. 5 is quite similar to the form shown in Fig. 4, it being comprised of the outer container 1c, lower plate 2c and upper section 3c, both the lower plate and upper section being arranged to revolve and the upper section being also vertically movable. This form is particularly adaptable where it is desired to freeze only one side of the product or one side at a time. The section 3c is held in resting position by the stop 4c being turned under the flange 5c.

In Figs. 6 and 7 is shown a different form of bottom plate. This form is also cellular, the refrigerant being contained therein and not having any means to force it against the upper refrigerating surface and to overcome the difficulty caused by the refrigerant in contacting with the upper refrigerating surface 1d, we construct the vertical walls 2d sufficiently thick to conduct the low temperature from the refrigerant resting on the lower surface 3d to the upper surface 1d.

As before stated, our invention is particularly applicable to establishments wherein it is desired to freeze a small quantity of a product at a time and also particularly adaptable to utilize the full benefits of solid carbon dioxide as a refrigerant while at the same time it does not have the drawback of bringing an objectionable substance such as brine in contact with the product to be frozen.

We claim:

1. A freezing apparatus comprising upper and lower frozen surfaces contacting with a refrigerant and product to be frozen, said upper surface being vertically movable and revolvable and said lower surface being revolvable.

2. A freezing apparatus comprising an outer container, a refrigerating surface one side of which is in contact with a refrigerant and the other side being in contact with a product to be frozen and an upper vertically movable closure section.

3. A freezing apparatus comprising an upper and lower refrigerating surface, said lower surface being revolvable and said upper surface being vertically movable and revolvable and having therethrough an opening to permit of access to the space between the upper and lower surfaces.

4. A method of quick freezing resilient freezable products, which includes compressing relatively thin layers thereof between metallic plate elements, and maintaining their contact surfaces at temperatures far below the freezing point of said products by pressing solid carbon dioxide in intimate heat exchange relation with other surfaces of each of said plate elements; and, throughout the freezing operation, maintaining an atmosphere of carbon dioxide gas sublimated from said solid, in submerging relation to said plate elements and the products compressed thereby.

5. A quick freezer for resilient products, including metallic plate elements and means for resiliently compressing relatively thin layers of said products between them, maintaining said plate elements at temperatures far below the freezing point of said product by pressing solid carbon dioxide in intimate heat exchange relation with other surfaces of each of said plate elements, and means for maintaining an atmosphere of carbon dioxide gas sublimated from said solid, in submerging relation to said plate elements, said products and said solid.

Signed, at New York, in the county of New York and State of New York, this 31st day of December, A. D. 1929.

CHARLES L. JONES.
JOHN D. SMALL.